United States Patent
Pezeshkian et al.

(10) Patent No.: US 8,219,023 B1
(45) Date of Patent: Jul. 10, 2012

(54) REMOTELY OPERATED ILLUMINATION DEVICE

(75) Inventors: Narek Pezeshkian, Glendale, CA (US); Aaron Burmeister, San Diego, CA (US); Hoa Nguyen, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 279 days.

(21) Appl. No.: 12/725,237

(22) Filed: Mar. 16, 2010

Related U.S. Application Data

(63) Continuation-in-part of application No. 12/503,170, filed on Aug. 17, 2009, and a continuation-in-part of application No. 11/832,065, filed on Aug. 1, 2007.

(51) Int. Cl.
*H04B 17/15* (2006.01)

(52) U.S. Cl. .................... 455/11.1; 455/13.1; 455/157.2; 455/159.1

(58) Field of Classification Search ............. 455/7, 11.1, 455/3.03, 419, 420, 9, 13.1, 16, 41.2, 552.1, 455/352, 353, 157.2, 158.4, 159.1; 307/66, 307/64; 257/99, 706; 398/183; 362/373, 362/800; 342/14
See application file for complete search history.

(56) References Cited

U.S. PATENT DOCUMENTS

| | | | |
|---|---|---|---|
| 6,417,807 B1 * | 7/2002 | Hsu et al. ............... | 343/700 MS |
| 2005/0036622 A1 * | 2/2005 | Hay et al. ....................... | 380/270 |
| 2005/0264472 A1 * | 12/2005 | Rast ................................ | 345/30 |
| 2006/0147219 A1 * | 7/2006 | Yoshino et al. ............... | 398/183 |
| 2006/0262545 A1 * | 11/2006 | Piepgras et al. ............. | 362/373 |
| 2007/0080360 A1 * | 4/2007 | Mirsky et al. ................... | 257/99 |
| 2007/0177086 A1 * | 8/2007 | Ishitani et al. ................ | 349/117 |
| 2008/0170296 A1 * | 7/2008 | Chaves et al. .................. | 359/641 |
| 2010/0165248 A1 * | 7/2010 | Ham et al. ....................... | 349/64 |
| 2010/0259436 A1 * | 10/2010 | Brumley et al. ................ | 342/14 |
| 2011/0121654 A1 * | 5/2011 | Recker et al. ................... | 307/66 |
| 2011/0133655 A1 * | 6/2011 | Recker et al. .................. | 315/159 |
| 2012/0056076 A1 * | 3/2012 | Tian et al. .................. | 250/208.1 |

* cited by examiner

*Primary Examiner* — Tan Trinh
(74) *Attorney, Agent, or Firm* — Ryan J. Friedl; Kyle Eppele

(57) ABSTRACT

A system includes a substrate having a first side and a second side, more than one optical sources, wherein at least one optical source is coupled to the first side and at least one optical source is coupled to the second side, a power source operatively connected to the optical sources, a switch connected to the power source, and an RF receiver connected to the switch. The optical sources may be LEDs and may operate within the visible or infrared spectrum. The system may include an enclosure that is configured to be attached to antenna masts of a radio relay device. The enclosure may have windows to allow light from the optical sources to pass unobstructed through the enclosure. In some embodiments, the system is contained within the radio relay device. The system may be remotely controlled to illuminate a distant object or structure.

24 Claims, 9 Drawing Sheets

REMOTELY OPERATED ILLUMINATION DEVICE

CROSS-REFERENCES TO RELATED APPLICATIONS

This application is a continuation-in-part of commonly-assigned U.S. application Ser. No. 11/832,065, filed Aug. 1, 2007, entitled "Wireless, Self-Contained Relay Device," and commonly-assigned U.S. application Ser. No. 12/503,170, filed Aug. 17, 2009, entitled "Next Generation Automatically-Deployed Communication Relay," the entire content each application fully incorporated by reference herein.

FEDERALLY-SPONSORED RESEARCH AND DEVELOPMENT

The Remotely Operated Illumination Device is assigned to the United States Government and is available for licensing for commercial purposes. Licensing and technical inquiries may be directed to the Office of Research and Technical Applications, Space and Naval Warfare Systems Center, San Diego, Code 72120, San Diego, Calif., 92152; voice (619) 553-2778; email ssc_pac_T2@navy.mil. Reference Navy Case Number 100338.

BACKGROUND

Methods to illuminate a target area include manual use of a flashlight or spotlight aimed at the target area. While such method is useful for close-proximity illumination, it gives away the location of the operator because the light can be traced back to a source. If the operator desires to be located at a sufficient distance from the target area, a high-powered light is required, which may not be available and does not allow for secrecy of the operator's position. A need exists for a remotely operated illumination device that overcomes the aforementioned drawbacks.

DETAILED DESCRIPTION OF SOME EMBODIMENTS

Figure 1:
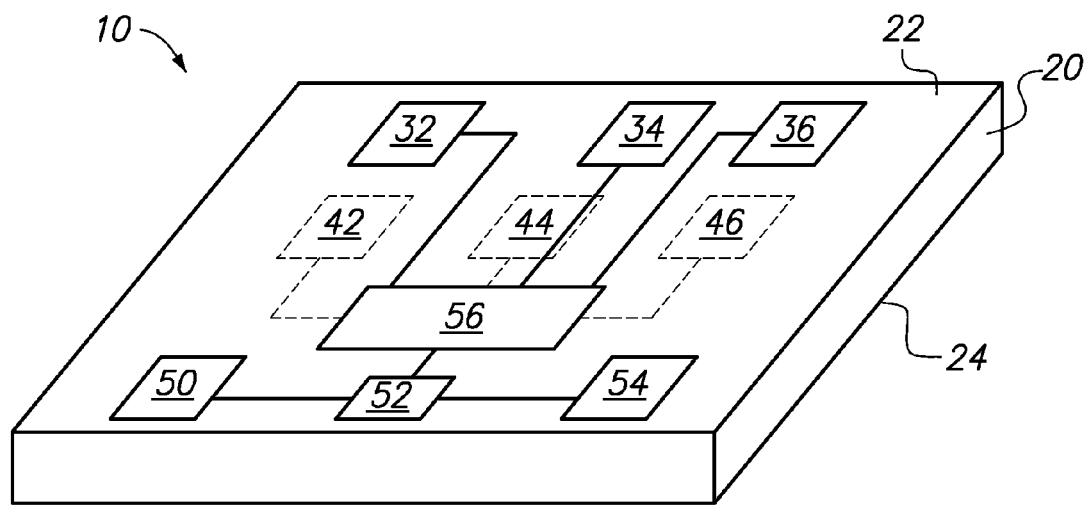
FIG. 1 shows a perspective view of an embodiment of a system in accordance with the Remotely Operated Illumination Device.

FIG. 1 shows a perspective view of an embodiment of a system 10 in accordance with the Remotely Operated Illumination Device. System 10 includes a substrate 20, optical sources 32, 34, 36, 42, 44, and 46, power source 50, switch 52, radio frequency (RF) receiver 54, and circuitry 56. Substrate 20 includes a first side 22 and a second side 24. Optical sources 32, 34, and 36 are coupled to first side 22, while optical sources 42, 44, and 46 are coupled to second side 24. In some embodiments, a set of optical sources may comprise one optical source coupled to first side 22 and one optical source coupled to second side 24. In other embodiments, a set of more than one optical sources may be coupled to first side 22 and a set of more than one optical sources may be coupled to second side 24.

In some embodiments, optical sources 32, 34, 36, 42, 44, and 46 comprise light emitting diodes (LEDs). In other embodiments, the optical sources may comprise other light-emitting sources as recognized by one having ordinary skill in the art. The optical sources may operate at various wavelengths throughout the electromagnetic spectrum, depending upon the particular application. In some embodiments, the optical sources may operate within the infrared spectrum. In other embodiments, the optical sources may operate within the visible spectrum. In other embodiments, the optical sources may operate in any spectrum that illuminates a target for an electro-optical viewer. In some embodiments, at least one optical source of the set of optical sources operates at a different wavelength than at least another optical source of the set of optical sources. For example, optical source 32 may operate within the infrared spectrum, while optical source 34 operates within the visible spectrum.

Power source 50 is operatively connected to switch 52. Examples of power source 50 include batteries and/or a solar cell(s). Switch 52 is operatively connected to circuitry 56 and is turned on an off by a signal received from RF receiver 54, which is operatively connected to switch 52. The signal received by RF receiver 54 may come from a remote source, allowing system 10 to be remotely operated. Circuitry 56 is connected to optical sources 32, 34, 36, 42, 44, and 46. Circuitry 56 may contain drivers for optical sources 32, 34, 36, 42, 44, and 46, power management circuitry to provide regulated power to the optical sources, or other circuitry as may be required for the operation of system 10. In some embodiments, circuitry 56 may further include an accelerometer or gravity activated switch that is configured to turn off the optical sources that are contacting a surface (such as the ground), when system 10 is deployed.

Figure 2:
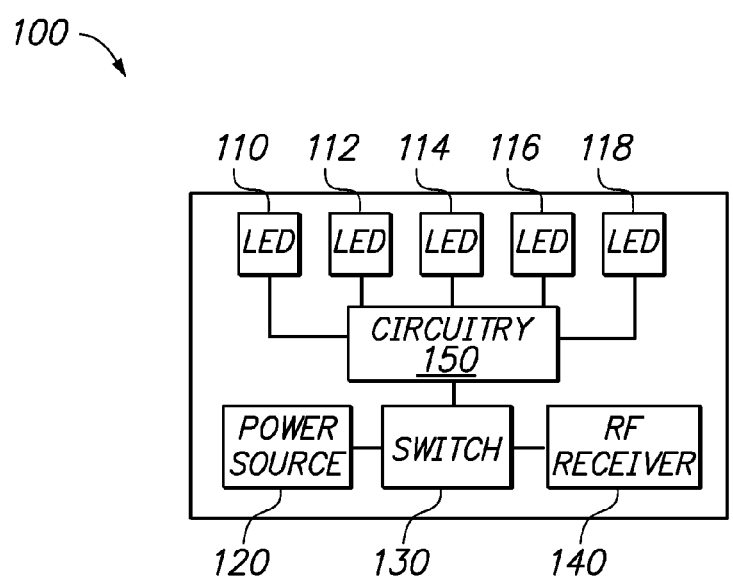
FIG. 2 shows a block diagram of an embodiment of a system in accordance with the Remotely Operated Illumination Device.

FIG. 2 shows a block diagram of an embodiment of a system 100 in accordance with the Remotely Operated Illumination Device. System 100 may be configured similarly as system 10 shown in FIG. 1. System 100 includes LEDs 110, 112, 114, 116, and 118 connected to circuitry 150. System 100 includes a power source 120 connected to a switch 130, which is turned on an off by an RF receiver 140 connected thereto. Circuitry 150 is connected to switch 130. Circuitry 150 may be configured similarly to circuitry 56 of FIG. 1. As such, circuitry 150 may contain drivers for LEDs 110, 112, 114, 116, and 118, power management circuitry, or other circuitry as is required for the operation of system 100. In some embodiments, circuitry 150 may allow a user to selectively activate one or more of LEDs 110, 112, 114, 116, and 118, rather than all of the LEDs activated at one time. Such flexibility allows the user to provide varying levels of illumination depending upon the scenario or desired illumination target.

Figure 3:
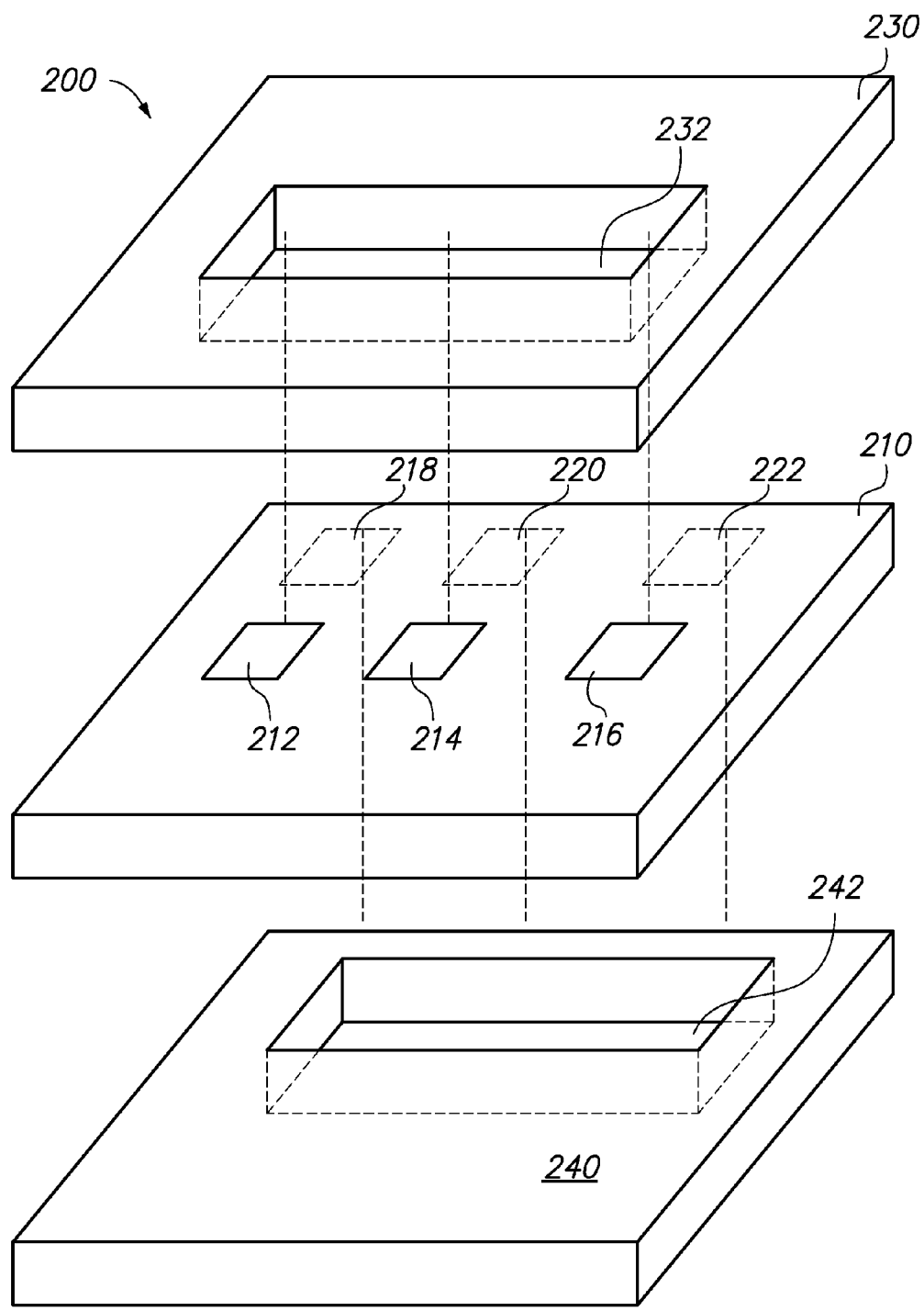
FIG. 3 shows an exploded view of an embodiment of a system having an enclosure, in accordance with the Remotely Operated Illumination Device.

FIG. 3 shows an exploded view of an embodiment of a system 200 having an enclosure, in accordance with the Remotely Operated Illumination Device. System 200 includes a substrate 210 with optical sources 212, 214, and 216 coupled to a first side and optical sources 218, 220, and 222 coupled to a second side. It should be recognized that system 200 may include more or less optical sources depending upon the application. For example, substrate 210 may include five optical sources coupled to the first side and five optical sources coupled to the second side of substrate 210.

System 200 may include an enclosure having a first potion 230 and a second portion 240. First portion 230 and second portion 240 may comprise various materials, such as aluminum, stainless steel, and plastic. First portion 230 includes a window 232 therein. Second portion 240 includes a window 242 therein. When joined, substrate 210 is positioned within the enclosure such that optical sources 212, 214, and 216 are aligned with window 232 and optical sources 218, 220, and 222 are aligned with window 242.

Figure 4:
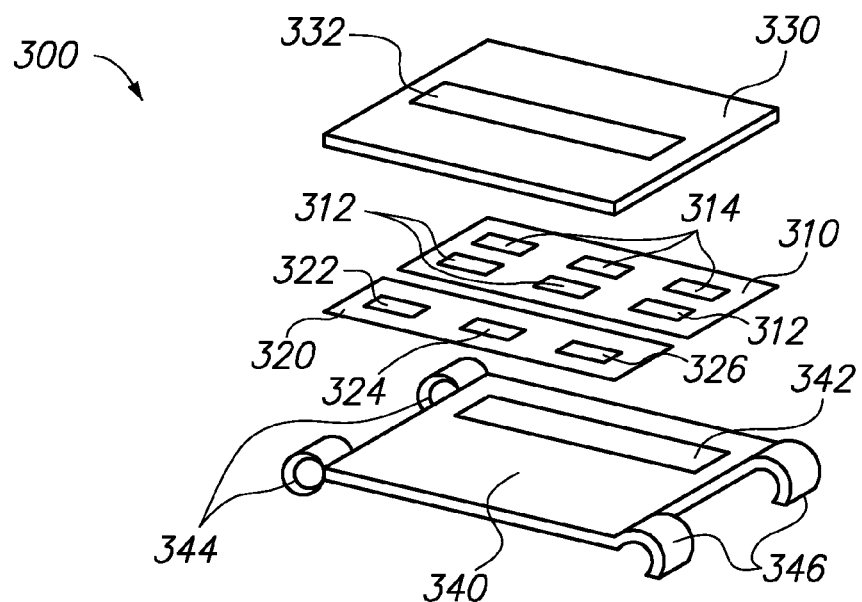
FIG. 4 shows an exploded view of another embodiment of a system with an enclosure, in accordance with the Remotely Operated Illumination Device.

FIG. 4 shows an exploded view of another embodiment of a system 300 with an enclosure, in accordance with the Remotely Operated Illumination Device. System 300 includes a first substrate 310 with optical sources 312 on a first side and optical sources 314 on a second side. System 300 further includes a second substrate 320, which may contain components including, but not limited to a power source 322, switch 324, RF receiver 326, and circuitry (not shown) thereon. System 300 may further include a first portion 330 having a window 332 therein and a second portion 340 having a window 342 therein. First portion 330 and second portion 340 may be configured to be secured together to enclose substrate 310, and thus form an enclosure.

When enclosed within first portion 330 and second portion 340, substrate 310 is positioned such that optical sources 312 are aligned with window 332 and optical sources 314 are aligned with window 342. Such a configuration allows for light emitted from optical sources 312 and 314 pass through first portion 330 and second portion 340, respectively, without obstruction, as is shown in FIG. 9B.

Second portion 340 further includes attachment means 344 and 346 coupled thereto, to allow system 300 to be coupled to a radio relay device. In embodiments wherein system 300 is desired to be attached to two antenna masts of a radio relay device (such as in FIG. 5), attachment means 344 and 346 may be configured as is shown in FIG. 4. As shown in FIG. 4, attachment means 344 are shaped to slide over an antenna mast. In some embodiments, attachment means 344 may be fixed to the antenna mast such as by screws or an adhesive.

Further, attachment means 346 may be configured such that they can snap or hook to a support of system 300. As an example, attachment means may be configured to snap or hook to an antenna mast of system 300. In some embodiments, attachment means 344 and 346 may be configured to engage an antenna mast in the same manner (i.e. both configured to snap to an antenna mast). It should be recognized that attachment means 344 and 346 are not limited to those embodiments shown in FIG. 4, but rather that system 300 may employ various other means to secure system 300 to any type of support, as is recognized by one having ordinary skill in the art.

Figure 5:
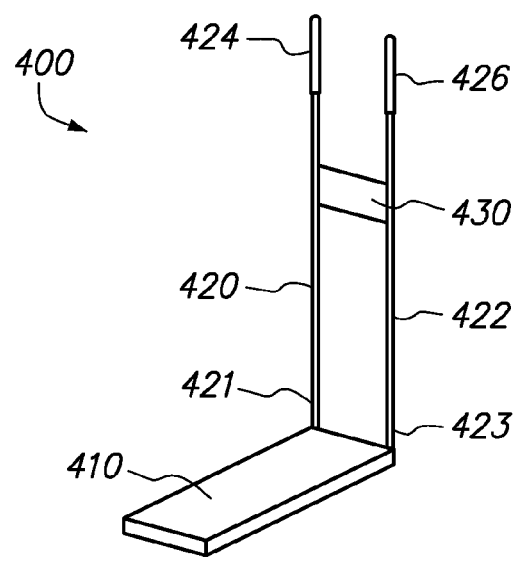
FIG. 5 shows a perspective view of an embodiment of a system including an illumination device coupled to a radio relay device, in accordance with the Remotely Operated Illumination Device.

FIG. 5 shows a perspective view of an embodiment of a system including an illumination device coupled to a radio relay device, in accordance with the Remotely Operated Illumination Device. System 400 includes a radio relay device having a housing 410, antenna masts 420 and 422, and antenna elements 424 and 426.

In operation, antenna masts 420 and 422 may be hollow to allow cables, such as RF coaxial cables or power cables, one from each of antenna elements 424 and 426, to pass through antenna masts 420 and 422. In embodiments where RF coaxial cables pass through antenna elements 424 and 426, the cables may terminate in a right-angle RF connector (not shown) at proximal ends 421 and 423 of antenna masts 420 and 422, respectively. In some embodiments, the right-angle RF connectors on proximal ends 421 and 423 may be plugged into and securely mounted to an external interface of an antenna mast rotation mechanism (such as mechanism 650 shown in FIG. 7). This external interface allows antenna elements 424 and 426 to connect to a radio (not shown) inside housing 410 via a series of RF connectors.

An illumination device 430, such as that shown in FIGS. 3 and 4, is coupled to the radio relay device. As shown, illumination device 430 is directly coupled to antenna masts 420 and 422. In some embodiments, such attachment may occur via attachment means 344 and 346, as shown in FIG. 4. The configuration of system 400 shown in FIG. 5 may be used to provide horizontal illumination to one or more objects, as shown in FIG. 9B.

Figure 6:
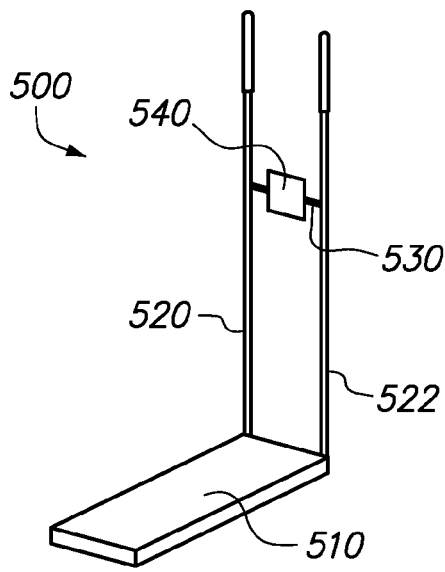
FIG. 6 shows a perspective view of another embodiment of a system including an illumination device coupled to a radio relay device, in accordance with the Remotely Operated Illumination Device.

FIG. 6 shows a perspective view of another embodiment of a system 500 including an illumination device coupled to a radio relay device, in accordance with the Remotely Operated Illumination Device. System 500 includes a radio relay device having a housing 510 and antenna masts 520 and 522. Antenna masts 520 and 522 may be joined by a crossbar 530. Crossbar 530 contributes to antenna strength and allows system 500 to be more easily retrieved. An illumination device 540, such as that shown in FIGS. 3 and 4, is coupled to the radio relay device. As shown, illumination device 540 is coupled to crossbar 530. Such coupling may occur via various methods, including via fasteners such as screws, adhesives, or ties. The configuration of system 500 shown in FIG. 6 may be used to provide illumination to one or more objects, as shown in FIG. 9B. Such illumination may be horizontal and/or vertical, depending upon the orientation and configuration of the optical sources within the illumination device.

In some embodiments, crossbar 530 may further include, in addition to illumination device 540, a sensor (not shown) coupled thereto. The sensor may be any sensor capable of sensing a desired aspect of the environment. For example, the sensor may be a video camera mounted on crossbar 530 with cabling running down antenna masts 520 and 522 and a radio within housing 510. Such a configuration enables system 500 to not only illuminate an object or structure, but also to relay a video stream.

Figure 7:
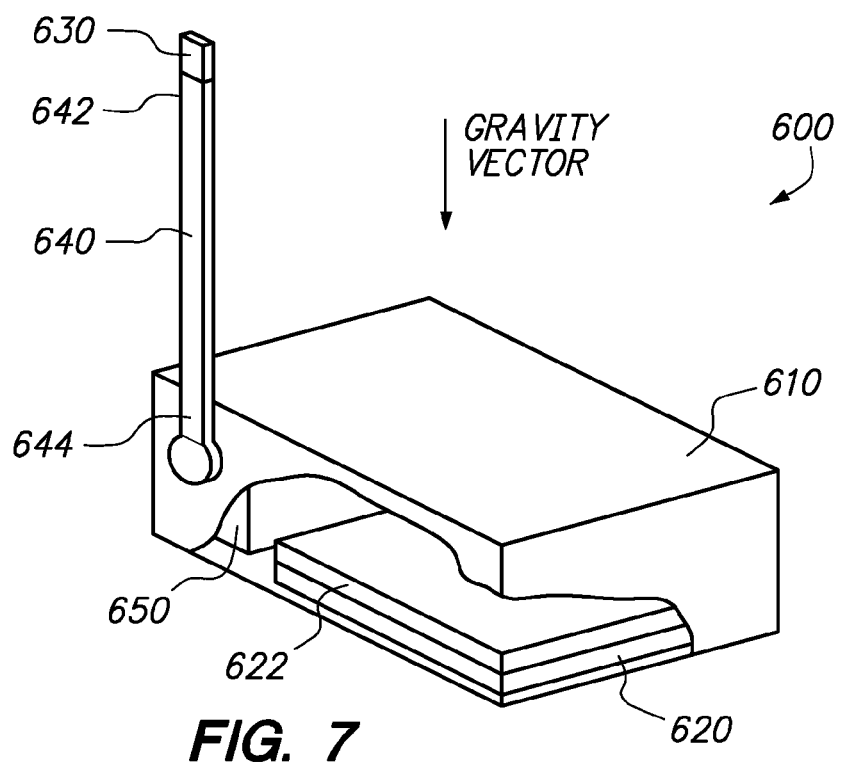
FIG. 7 shows a perspective view of an embodiment of a radio relay device for use with a system in accordance with the Remotely Operated Illumination Device.

FIG. 7 shows a perspective view of an embodiment of a radio relay device 600 for use with a system in accordance with the Remotely Operated Illumination Device. As shown, system 600 comprises a housing 610, a radio 620, an accelerometer 622, an antenna element 630, an antenna mast 640, and an antenna mast rotation mechanism 650. Radio 620, accelerometer 622, and antenna mast rotation mechanism 650 are mounted within housing 610. It is to be understood that while FIG. 7 depicts housing 610 as a rectangular prism, housing 610 may be any desired shape or size that is configured to contain radio 620 and antenna mast rotation mechanism 650.

Antenna mast 640 has a distal end 642 and a proximal end 644. Antenna element 630 is operatively coupled to radio 620 and mechanically coupled to distal end 642. Proximal end 644 is rotatably coupled to housing 610 and antenna mast rotation mechanism 650. Antenna mast rotation mechanism 650 is configured to upwardly rotate antenna mast 640 to a raised position such that antenna mast 640 is substantially parallel to the ambient gravity vector as shown. In embodiments wherein system 600 includes two antenna masts, such masts may be simultaneously raised by rotation mechanism 650.

In one embodiment, antenna mast rotation mechanism 650 employs an electronically controlled servo motor (not shown). The servo motor may be linked to antenna mast 640 by a gear reduction system. This arrangement provides a single degree of freedom (DOF) for the rotation of antenna mast 640 about a rotational axis. Once antenna mast rotation mechanism 650 has positioned antenna mast 640 to be substantially parallel to the ambient gravity vector, an antenna friction brake (not shown) may be used to hold antenna mast 640 in position.

In one embodiment wherein system 600 includes two antenna masts, the antenna friction brake may comprise an elastic member in frictional contact with a shaft that connects the antenna masts. The strength with which the antenna friction brake holds the antenna masts may be varied by adjusting the elasticity of the elastic member or varying the number of elastic members.

Figure 10:
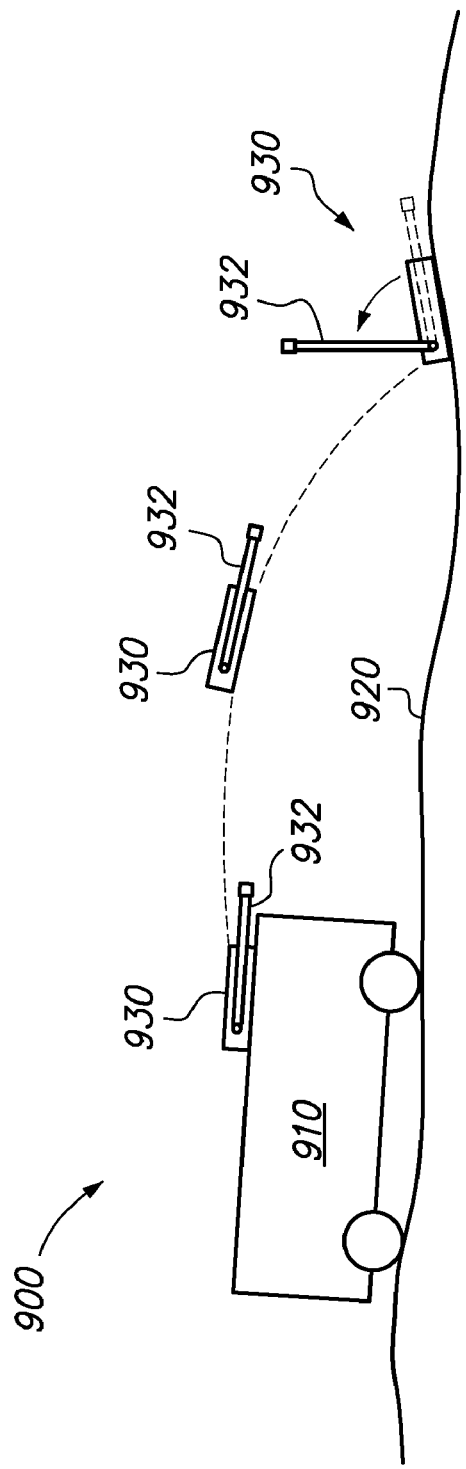
FIG. 10 shows a diagram illustrating the ejection and deployment of a radio relay device from a mobile platform, in accordance with the Remotely Operated Illumination Device.

Accelerometer 622 may be a three-axis accelerometer and may be used to determine proper antenna mast 640 alignment and to detect vibrations in a support surface, such as support surface 920 shown in FIG. 10. Depending upon which way system 600 lands after being deployed from a mobile platform (see FIG. 10), antenna mast rotation mechanism 650 rotates antenna mast 640 such that antenna mast 640 is raised to the nearly optimal position above support surface 920, as determined by the system through the use of the accelerometer 622.

Figure 11A:
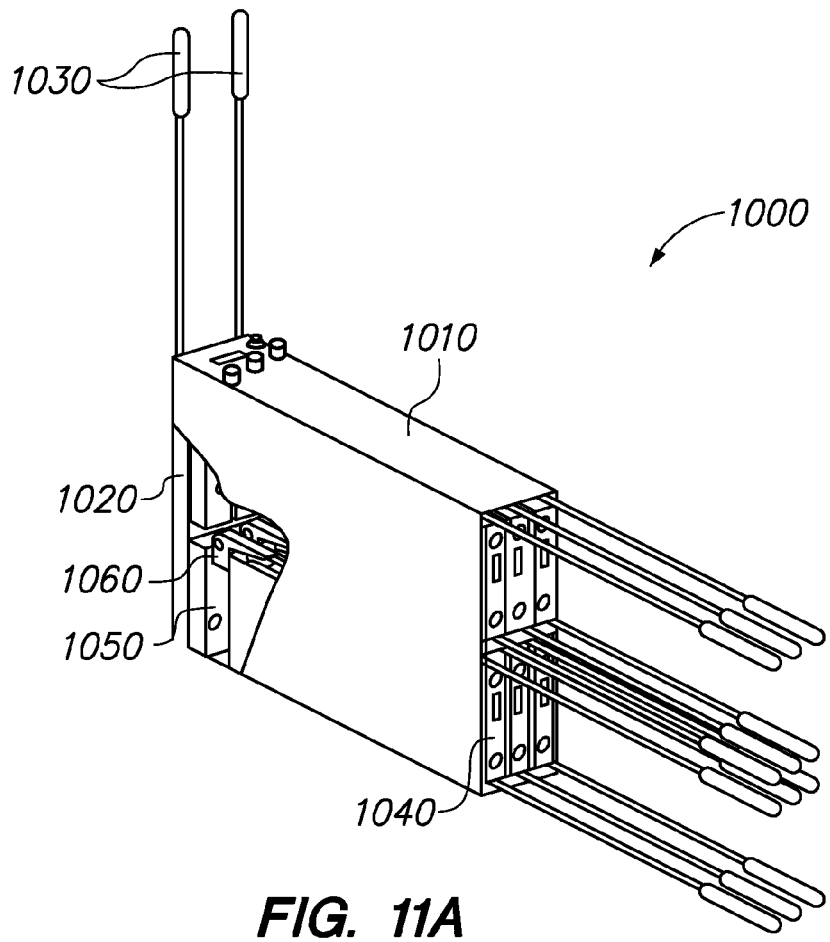
FIG. 11A shows a perspective view of a multiple radio relay device storage unit in accordance with the Remotely Operated Illumination Device.

System 600 may be configured to be stored on mobile platform, such as mobile platform 910 shown in FIG. 10, with antenna mast 640 in a position parallel to the length of housing 610, as shown in FIG. 11A. Due to the shape of housing 610, once system 600 is deployed from the mobile platform, it will either land on an upper surface or lower surface. Once system 600 comes to rest on a support surface, accelerometer 622 is configured to measure the components of the gravity vector along each of its three axes.

Using these components, a mast rotation angle is determined such that, when rotated to this angle, antenna mast 640 will be substantially parallel to the gravity vector.

Position feedback of antenna mast rotation mechanism 650 may be obtained by means known to those having ordinary skill in the art. As a non-limiting example, position feedback of antenna mast rotation mechanism 650 may be obtained by using an absolute encoder that may be embedded in the servo motor's drive axis. The absolute encoder may comprise an integrated circuit that reads the rotational position of a magnet that is securely fastened to the gear located on the servo motor.

Figure 8A:
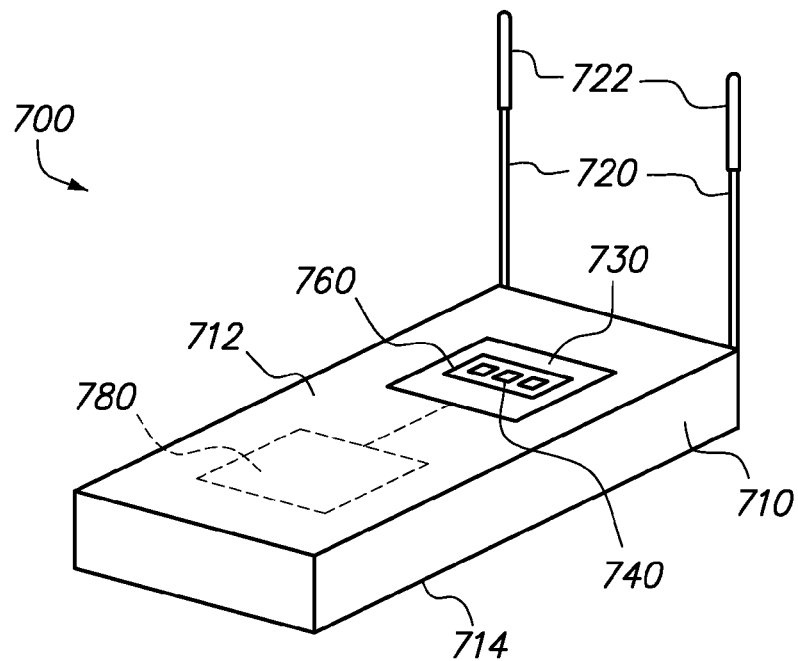
FIGS. 8A and 8B show perspective views of an embodiment of an illumination device contained within a radio relay device, in accordance with the Remotely Operated Illumination Device.
Figure 8B:
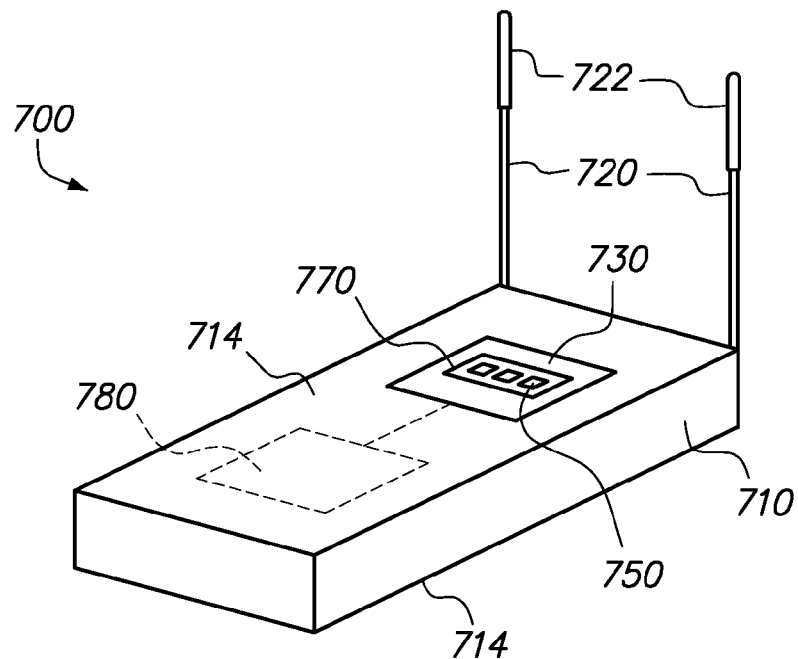

FIGS. 8A and 8B show perspective views of an embodiment of a system 700 contained within a radio relay device, in accordance with the Remotely Operated Illumination Device. System 700 includes a housing 710, antenna masts 720, antenna elements 722, illumination device 730, and circuitry 780. Housing 710 has a first side 712 and a second side 714. Illumination device 730 contains optical sources 740 and 750. Optical sources 740 are in alignment with window 760, which is aligned with first side 712. Optical sources 750 are in alignment with window 770, which is aligned with second side 714.

Circuitry 780 is contained within housing 710 and is connected to illumination device 730. Circuitry 780 may include components such as a power source, a switch, an RF receiver, and other circuitry that may be required for the functionality of illumination device 730. In some embodiments, circuitry 780 is not contained separate from illumination device 730 within housing 710, but rather is contained within illumination device 730. In such embodiments, circuitry 780 may be contained on a substrate separate from the substrate containing optical sources 740 and 750, as shown in FIG. 4.

Figure 9A:
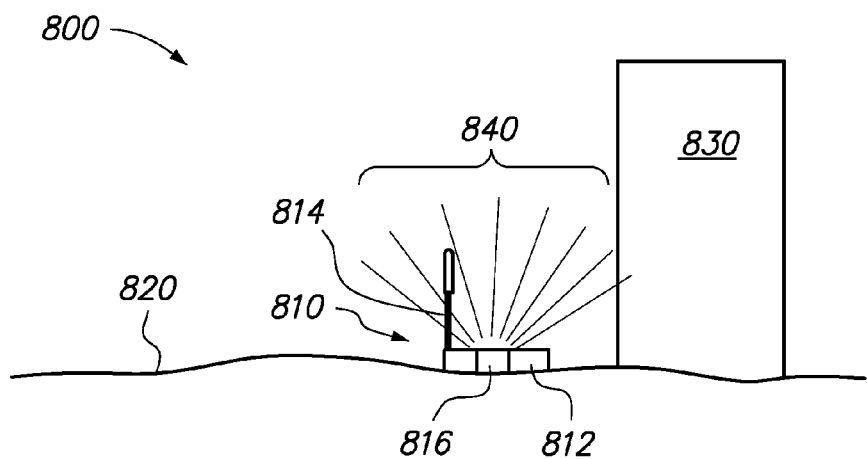
FIGS. 9A and 9B show perspective views of the illumination capability of an embodiment of an illumination device coupled to and contained within a radio relay device, in accordance with the Remotely Operated Illumination Device.
Figure 9B:
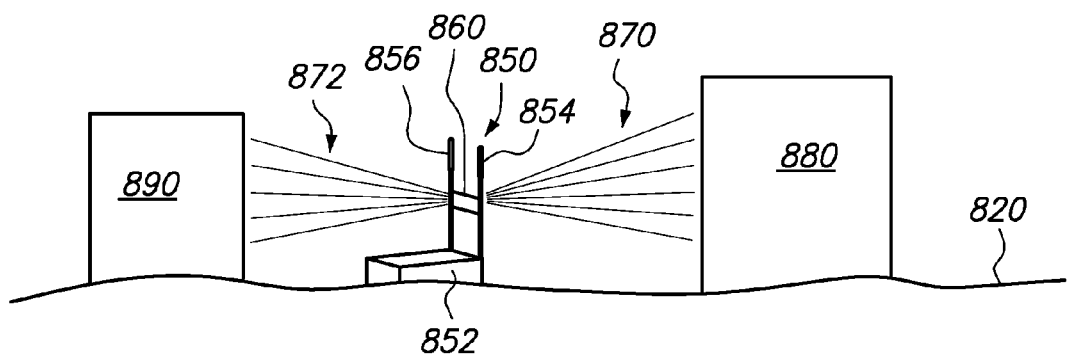

FIGS. 9A and 9B show perspective views of the illumination capability of an embodiment of an illumination device coupled to and contained within a radio relay device, in accordance with the Remotely Operated Illumination Device. As shown in FIG. 9A, diagram 800 includes a system 810 including a housing 812, antenna mast 814, and an illumination device 816 contained within housing 812, located on a surface 820. System 810 is located proximate to a structure 830. As an example, structure 830 may be a building. However, it should be recognized that structure 830 may comprise other structures, as well any object desired to be illuminated. When system 810 receives a signal, a switch may turn on a power source to cause illumination device 816 to illuminate structure 830 via optical sources contained within illumination device 816. Illumination device 816 may be configured such as shown in FIGS. 8A and 8B, thus allowing for structure 830 to be illuminated by light 840 no matter which side of housing 812 contacts surface 820.

As shown in FIG. 9B, a system 850 includes a housing 852, antenna masts 854 and 856, and an illumination device 860 coupled to antenna masts 854 and 856, located on surface 820. System 850 is located proximate to structures 880 and 890. Illumination device 850 may be configured similarly to illumination devices 400 and 500 as shown in FIGS. 5 and 6, respectively. As such, illumination device 860 may be oriented by antenna masts 854 and 856 such that, when turned on, light 870 illuminates structure 880 and light 872 illuminates structure 890.

FIG. 10 shows a diagram 900 illustrating the ejection and deployment of a radio relay device 930 from a mobile platform 910, in accordance with the Remotely Operated Illumination Device. Device 930 may be transferred from mobile platform 910 to a support surface 920 by various methods including, but not limited to, being ejected, dropped, placed, or embedded onto support surface 920. Support surface 920 may be any surface capable of supporting device 930 and mobile platform 910. Mobile platform 910 may be manned or unmanned, and may be any platform configured to carry device 930 and transit over support surface 920. Examples of a suitable mobile platform 910 include, but are not limited to: an automobile, a water craft, an autonomous robot, a remote-controlled robot, an animal (such as a rescue/security animal), airplane, unmanned aerial vehicle, and a human. Once deployed on surface 920, antenna masts 932 on system 930 may be rotated to an upward position (as shown by the arrow) such that they are substantially parallel to the ambient gravity vector.

After being deployed from mobile platform 910, system 930 may bounce, roll, and/or or rock on support surface 920 before it comes to rest. System 930 may be constructed such that its housing comes to rest on an upper surface or lower surface after being deployed from mobile platform 910. For example, in the embodiment shown in FIGS. 8A and 8B, first surface 712 and second surface 714 are larger than the sides of the housing, making it more likely that the housing will come to rest on either surface 712 or 714. In another example, the housing for system 930 may be weighted to allow system 930 to come to rest on any desired surface of the housing. Other means or configurations may be employed to cause the housing to come to rest in a particular orientation on support surface 920, as recognized by one having ordinary skill in the art.

FIG. 11A shows a perspective view of a multiple radio relay device storage unit 1000, in accordance with the Remotely Operated Illumination Device. Storage unit 1000 includes a housing 1010, which may be mounted on a mobile platform such as mobile platform 910 shown in FIG. 10. Housing may contain a radio 1020 having dual antennas 1030. Any desired number of radio relays devices 1040 may be stored within housing 1010. For each radio relay device 1040 contained within housing 1010, housing 1010 contains a corresponding infrared data association (IrDA) transceiver 1050 and a deployment mechanism 1060.

Figure 11B:
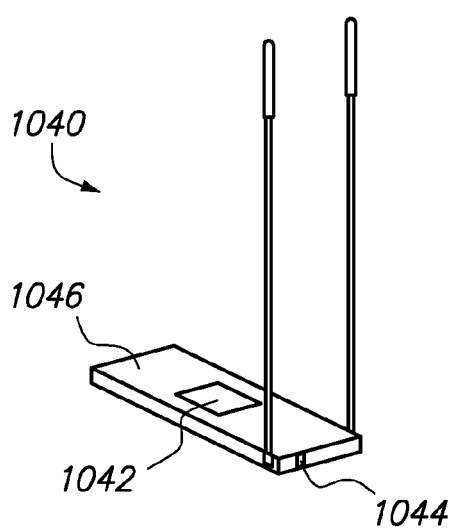
FIG. 11B shows an embodiment of a radio relay device for use with a multiple radio relay device storage unit, in accordance with the Remotely Operated Illumination Device.

FIG. 11B shows an embodiment of a radio relay device 1040 for use with radio relay storage unit 1000. Each radio relay device 1040 may include an illumination device 1042 and an IrDA window 1044 in device housing 1046. The radio relay device 1040 may bi-directionally communicate with its corresponding IrDA transceiver 1050 via the IrDA window 1044. Radio relay device 1040 is not limited to that shown in FIG. 11B, but may be configured similarly to the devices shown in FIGS. 5-8, provided such devices include an IrDA window.

Figure 12:
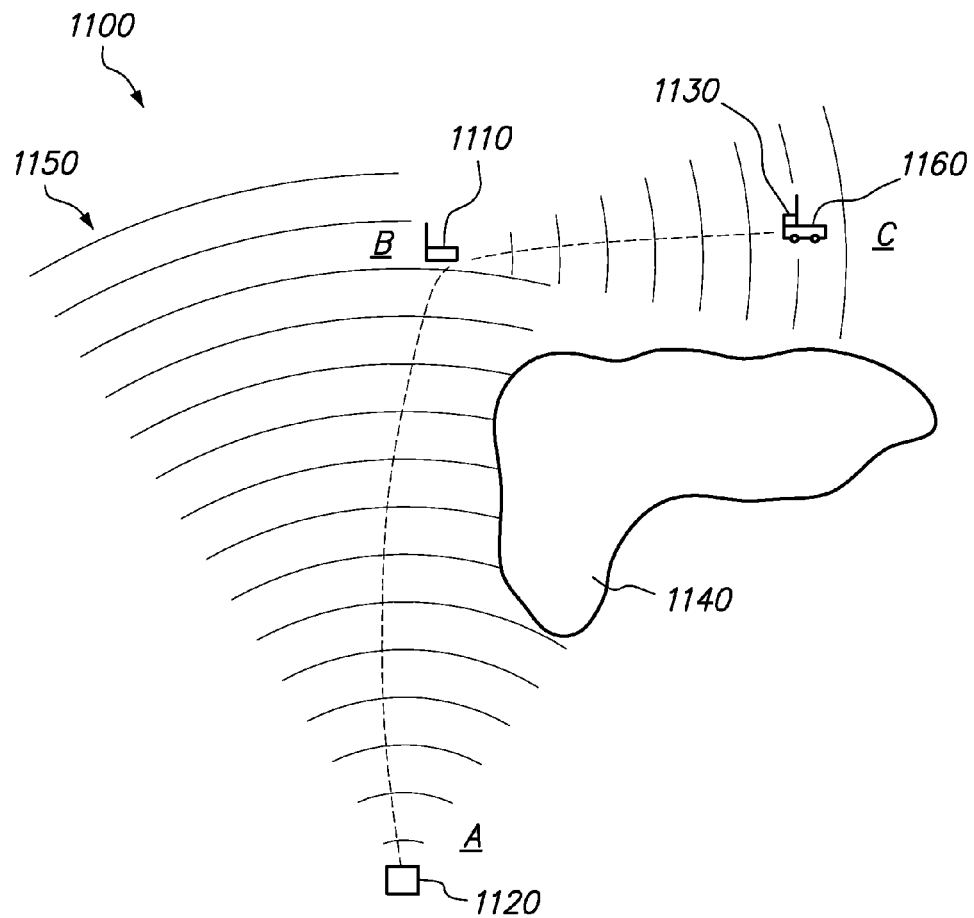
FIG. 12 shows a diagram illustrating communication between a radio relay device, a base station, and a radio relay device deployer, in the presence of an obstacle, in accordance with the Remotely Operated Illumination Device.

FIG. 12 shows a diagram 1100 illustrating communication between a radio relay device 1110, a base station 1120, and a radio relay device deployer 1130, in the presence of an obstacle 1140, in accordance with the Remotely Operated Illumination Device. Once deployed, a radio of system 1110 is configured to relay radio frequency (RF) signals and operate as a node in a telecommunications network 1150. System 1110 may be used to maintain contact between deployer 1130, which is mounted to mobile platform 1160, and base station 1120 in the presence of an obstacle 1140. Mobile platform 1160, traveling from position A towards position B, maintains line of sight (LOS) communications with base station 1120. However, as mobile platform 1160 begins to travel from position B to position C, radio communication becomes obstructed by obstacle 1140.

Examples of obstacles 1140 include, but are not limited to buildings, trees, hills, or any other physical or non-physical obstructions that negatively reflect, distort, and/or absorb radio signals. Base station 1120 may be any stationary or mobile site capable of being a node in network 1150. For example, base station 1120 may be, but is not limited to, a vehicle-mounted control center, a man-portable control center, or a control center in a building. FIG. 12 shows how a system 1110 may be placed in the vicinity of position B to allow mobile platform 1160 to continue around obstacle 1140 towards position C without losing radio connectivity with base station 1120.

System 1100 may be ruggedized such that it will continue to operate after being dropped from mobile platform 1160 while mobile platform 1160 is in motion. In addition to being built to withstand shock forces, system 1110 may also be constructed to protect against the entry of moisture and contaminants into its housing, allowing system 1110 to operate in outdoor environments. System 1110 may further comprise a global positioning system (GPS) receiver operatively coupled to a radio within its housing, such that the geo-spatial coordinates of the housing may be transmitted to another node in network 1150.

Many modifications and variations of the Remotely Operated Illumination Device are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system comprising:
   a substrate having a first side and a second side;
   more than one optical sources, wherein at least one optical source is coupled to the first side and at least one optical source is coupled to the second side;
   a power source operatively connected to the optical sources;
   a switch connected to the power source; and
   a radio frequency (RF) receiver connected to the switch.

2. The system of claim 1, wherein the optical sources comprise light emitting diodes (LEDs).

3. The system of claim 1, wherein the optical sources operate within the infrared spectrum.

4. The system of claim 1, wherein the optical sources operate within the visible spectrum.

5. The system of claim 1, wherein at least one optical source operates at a different wavelength than at least another optical source.

6. The system of claim 1 further comprising an enclosure with a first portion and a second portion, the first portion having a first window therein and the second portion having a second window therein, wherein the substrate is positioned within the enclosure such that the optical source coupled to the first side of the substrate is aligned with the first window and the optical source coupled to the second side of the substrate is aligned with the second window.

7. The system of claim 6 further comprising a second substrate positioned within the enclosure, wherein the power source, the switch, and the RF receiver are coupled to the second substrate.

8. The system of claim 6, wherein the enclosure is coupled to a radio relay device.

9. The system of claim 8, wherein the radio relay device comprises an antenna mast, wherein the enclosure is coupled to the antenna mast.

10. The system of claim 9, wherein the radio relay device further comprises:
   a housing; and
   an antenna mast rotation mechanism mounted within the housing and coupled to the antenna mast, wherein the antenna mast rotation mechanism is configured to rotate the antenna mast to a position such that the antenna mast is substantially parallel to an ambient gravity vector.

11. The system of claim 6, wherein the enclosure is contained within a radio relay device.

12. The system of claim 11, wherein the radio relay device has a first side and a second side, wherein the first window is aligned with the first side of the radio relay device and the second window is aligned with the second side of the radio relay device.

13. The system of claim 6, wherein the radio relay device comprises two antenna masts, wherein the enclosure is coupled to each of the antenna masts.

14. The system of claim 1, wherein the substrate, the power source, the switch, and the RF receiver are contained within a radio relay device.

15. A system comprising:
a radio relay device comprising
  a housing;
  at least one antenna mast coupled to the housing;
  an antenna mast rotation mechanism mounted within the housing and coupled to the antenna mast, wherein the antenna mast rotation mechanism is configured to rotate the antenna mast to a position such that the antenna mast is substantially parallel to an ambient gravity vector; and
an illumination device, coupled to the radio relay device, comprising:
  a substrate having a first side and a second side;
  more than one optical sources, wherein at least one optical source is coupled to the first side and at least one optical source is coupled to the second side;
  circuitry connected to the set of optical sources;
  a switch connected to the circuitry;
  a power source connected to the switch; and
  a radio frequency (RF) receiver connected to the switch.

16. The system of claim 15, wherein the optical sources comprise light emitting diodes (LEDs).

17. The system of claim 15, wherein the optical sources operate within the infrared spectrum.

18. The system of claim 15, wherein at least one optical source operates at a different wavelength than at least another optical source.

19. The system of claim 15 further comprising an enclosure with a first portion and a second portion, the first portion having a first window therein and the second portion having a second window therein, wherein the substrate is positioned within the enclosure such that the optical source coupled to the first side of the substrate is aligned with the first window and the optical source coupled to the second side of the substrate is aligned with the second window.

20. The system of claim 19 further comprising a second substrate positioned within the enclosure, wherein the circuitry, the power source, the switch, and the RF receiver are coupled to the second substrate.

21. The system of claim 15, wherein the radio relay device comprises two antenna masts, wherein the illumination device is coupled to each of the antenna masts.

22. The system of claim 15, wherein the radio relay device comprises two antenna masts joined by a crossbar, wherein the illumination device is coupled to the crossbar.

23. A system comprising:
a radio relay comprising
  a housing;
  an antenna mast coupled to the housing;
  an antenna mast rotation mechanism mounted within the housing and coupled to the antenna mast, wherein the antenna mast rotation mechanism is configured to rotate the antenna mast to a position such that the antenna mast is substantially parallel to an ambient gravity vector; and
an illumination device, contained within the radio relay, comprising:
  a substrate having a first side and a second side;
  more than one optical sources, wherein at least one optical source is coupled to the first side and at least one optical source is coupled to the second side;
  a power source operatively connected to the optical sources;
  a switch operatively connected to the power source; and
  a radio frequency (RF) receiver operatively connected to the switch.

24. The system of claim 23, wherein the radio relay device has a first side and a second side, wherein the first side of the substrate is aligned with the first side of the radio relay and the second side of the substrate is aligned with the second side of the radio relay.

\* \* \* \* \*